May 9, 1933. W. M. KELLY 1,907,981
LUBRICANT RECEIVING FITTING
Filed Sept. 23, 1931
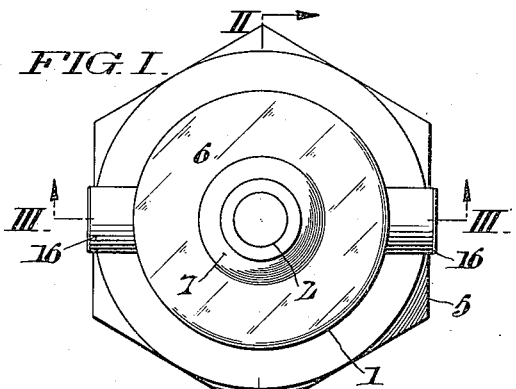
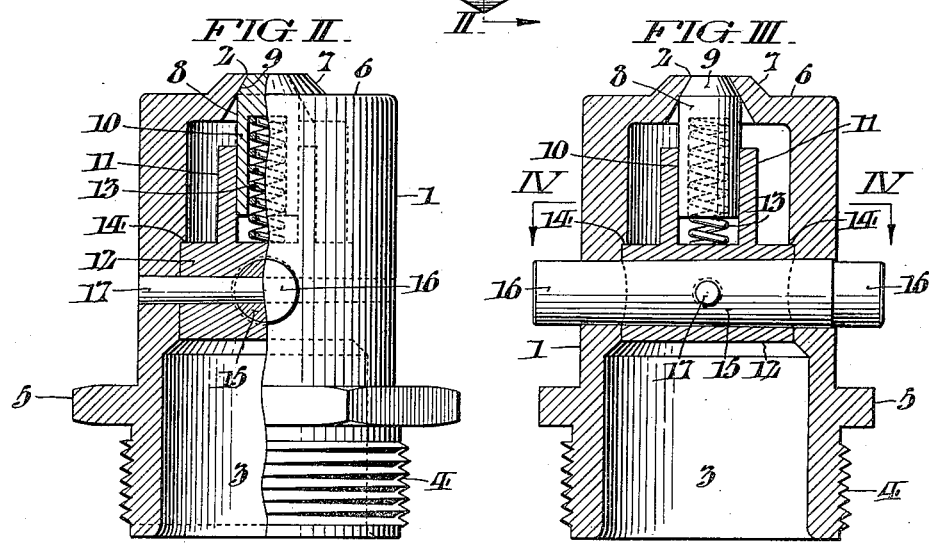
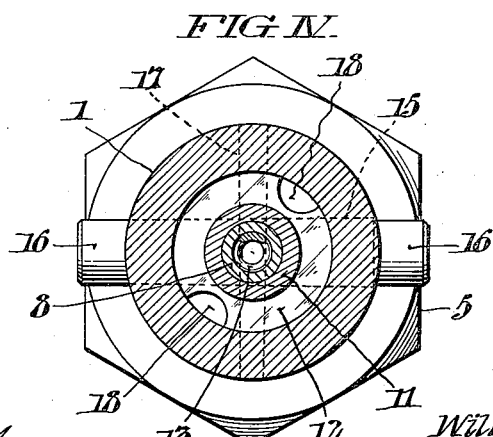
WITNESSES
Hubert Fuchs
William Bell, Jr.
INVENTOR:
William M. Kelly,
BY Fraley Paul
ATTORNEYS.

Patented May 9, 1933

1,907,981

UNITED STATES PATENT OFFICE

WILLIAM M. KELLY, OF PHILADELPHIA, PENNSYLVANIA

LUBRICANT RECEIVING FITTING

Application filed September 23, 1931. Serial No. 564,620.

This invention relates to lubricant receiving fittings, and more particularly to grease cups of the type adapted for interlocking connection with a grease gun which when applied to the grease cup discharges lubricant under pressure through a valve at the joint between the lubricant discharging and lubricant receiving parts.

The object of the invention is to provide in a fitting of this nature, wherein a spring is employed to hold the valve upon its seat, means for preventing the lubricant or foreign matter from coming in contact with the spring, whereby the life of the spring is increased and its positive operation is insured. The invention is further characterized by a special arrangement of parts for maintaining the valve in axial alignment with its seat.

Other objects and advantages more specifically characterizing my invention will become more fully apparent from the description hereinafter of one example or embodiment thereof, the description having reference to the accompanying drawing, whereof:

Figure I represents a plan view of a grease cup of my invention.

Fig. II represents a side elevation, and partly in vertical cross section, taken as indicated by the lines II—II in Fig I.

Fig. III represents a vertical cross section, taken as indicated by the lines III—III of Fig. I; and, Fig. IV represents a horizontal cross section, taken as indicated by the lines IV—IV in Fig. III.

With reference to the example of my invention shown in the drawing, the body of the grease cup is comprehensively designated at 1, the body defining a cylindrical chamber having a relatively small opening 2 at the top and a relatively large opening 3 at the bottom. The lower end of the grease cup is threaded at 4, and adjacent to the threads it is provided with a nut portion 5 whereby the grease cup may be readily screwed into a threaded opening in the apparatus to be lubricated.

The top face 6 of the grease cup is formed with a conical shaped boss 7 adapted to fit within a part of complementary shape at the discharge end of the grease gun. The opening 2 within the boss 7 is also formed with a conical surface which serves as a seat for a valve 8. The valve 8 is provided with a conical head 9 and a hollow cylindrical extension 10. Engaging the valve extension 10, there is a like hollow cylindrical part 11 which constitutes an integral extension of a stationary guide member 12. The respective extensions 10 and 11 of the valve 8 and guide 12 form a housing completely enclosing a compression spring 13, the extensions 10 and 11 being in sliding engagement, and the spring 13 serving to urge the valve 8 towards its seat.

The guide 12 is in the form of a perforated disk fitting snugly against the inner wall of the body 1 and bearing against a shoulder 14. A tapered pin 15 passes through a correspondingly shaped opening in the guide 12 and maintains the guide in fixed position within the body 1. The pin 15 projects at both ends 16 beyond the body 1 of the grease cup, the projecting ends 16 affording means for interlocking the grease cup with a fitting at the discharge end of a grease gun adapted for use with grease cups constructed as herein described. To hold the pin 15 in place, an additional tapered pin 17 is preferably utilized. The latter pin 17, which is of considerably less diameter, is disposed at right angles to the pin 15 and passes through openings in the pin 15, the guide 12 and the grease cup body 1. The small pin 17 is driven into these parts with a forced fit until its ends are flush with the outer wall of the body 1.

The guide 12 is provided, as shown in Fig. IV, with grooves 18 at diametrically opposite positions which constitute passages through which the lubricant passes when forced through the chamber of the grease cup.

When a grease gun or other lubricant discharging device is applied to the fitting of this invention, the lubricant is forced under pressure by the valve 8 against the pressure of the spring 13. With each stroke of the grease gun the valve 8 is forced away from its seat, and the lubricant is caused to pass through the opening 2 between the conical head 9 of the valve 8 and the similarly shaped surface at the opening 2. The lubricant then passes downward through the top of the chamber around the cylindrical extensions 10 and 11 of the valve 8 and guide 12. With continued pressure, the lubricant is then forced through the grooves 18 of the guide 12 into the lower part of the chamber of the grease cup body 1, from whence it may pass through the large opening 3 into the lubrication system of the apparatus to be lubricated. When pressure is removed by discontinuing the operation of the grease gun, the valve 8 is returned to its seat by the compression spring 13, and a tight joint is effected which prevents loss of grease and also prevents foreign matter from entering the grease cup.

From the above description it will be noted that the lubricant passing through the grease cup cannot penetrate the housing which surrounds the spring 13. It will also be noted that the extension 11 of the guide 12 maintains the valve 8 at all times in axial alignment with the opening at the valve seat. Furthermore, the tapered pin 15 performs the dual function of upholding the guide 12 in fixed position within the body of the grease cup, as well as affording a convenient means for effecting a locked joint between the grease gun and grease cup.

While I have described a particular embodiment of my invention in a grease cup, it will be apparent that various changes may be made in the form of the particular fitting herein described and illustrated without departing from the spirit of my invention as defined in the claim hereto annexed.

Having thus described my invention, I claim:

In a lubricant receiving fitting, a cylindrical chamber having an opening for the passage of lubricant into the chamber, a valve seated in said opening, a guide comprising a perforated disk fitting within the circumferential wall of said chamber and disposed across said chamber adjacent to the end of said valve, and a hollow cylindrical extension integral with said disk for maintaining the valve in axial alignment with said opening; a pin passing through said chamber and disk for securing said guide in fixed position within the chamber, said pin extending beyond the outer wall of the chamber to serve as a means for interlocking the chamber with a lubricant discharging device, and a spring urging said valve against said opening, said valve and the extension on said guide being slidable within each other and forming an enclosure completely housing said spring.

In testimony whereof, I have hereunto signed my name at Philadelphia, Pennsylvania, this 8th day of September, 1931.

WILLIAM M. KELLY.